Oct. 26, 1937.　　　　F. C. BEST　　　　2,097,362
MOTOR VEHICLE
Filed Jan. 2, 1934　　　　2 Sheets-Sheet 1
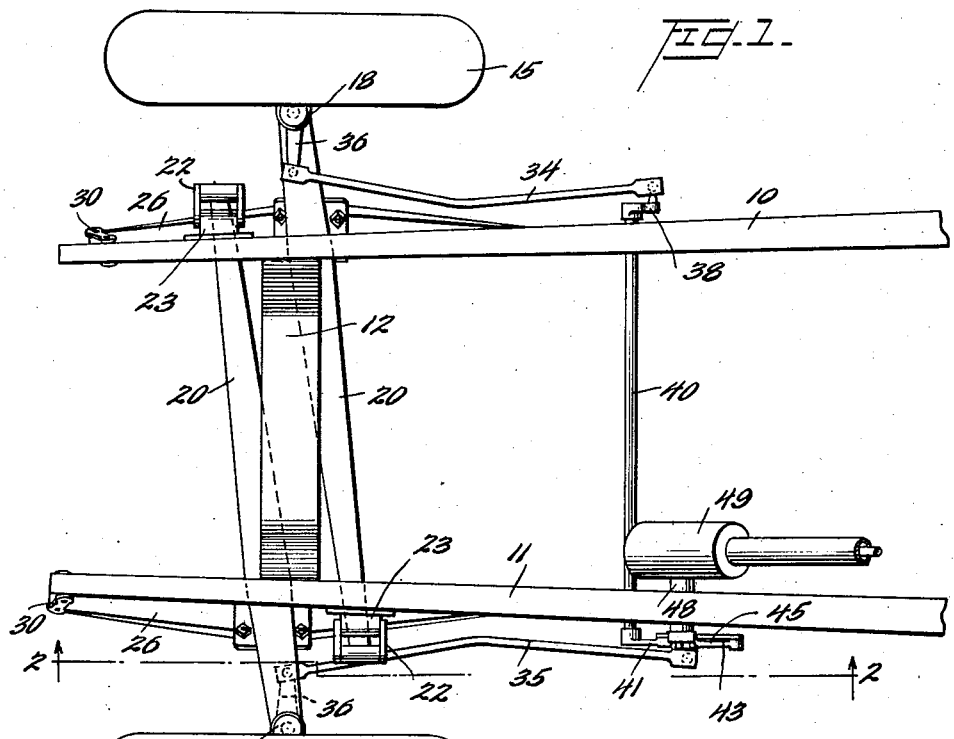
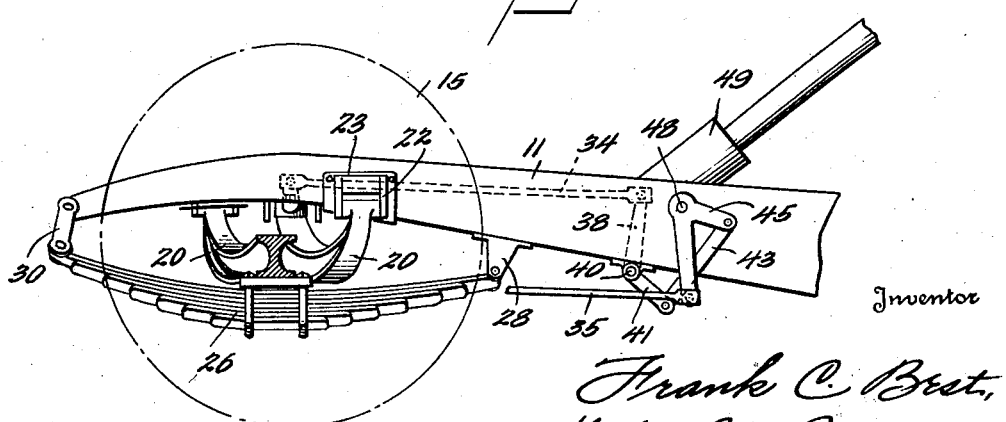
Inventor
Frank C. Best,
By Watson, Coit, Morse
& Grindle
Attorney Oct. 26, 1937. F. C. BEST 2,097,362
MOTOR VEHICLE
Filed Jan. 2, 1934 2 Sheets-Sheet 2
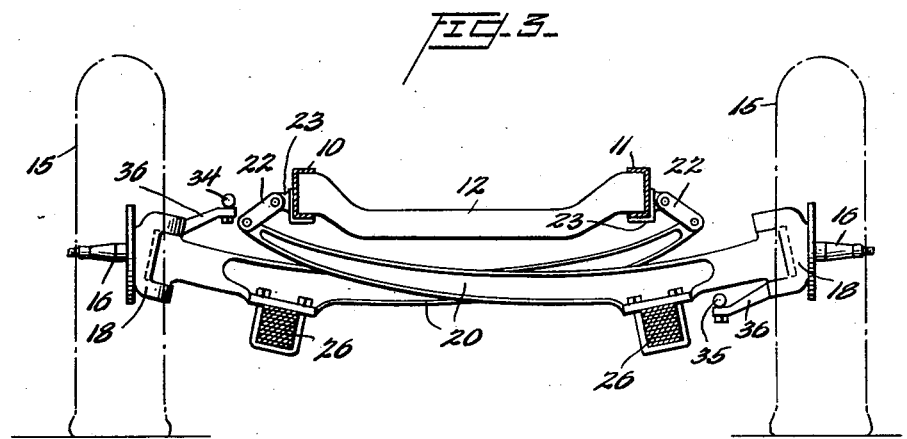
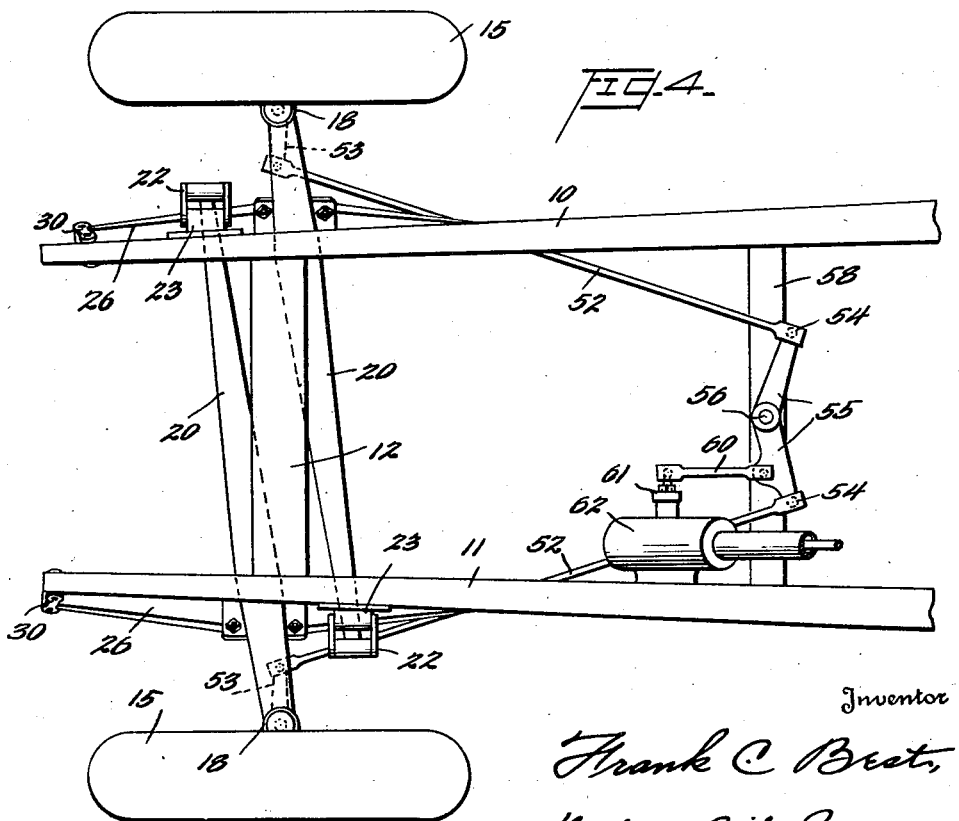
Inventor
Frank C. Best,
By Bateson, Coit, Morse & Grindle
Attorney Patented Oct. 26, 1937

2,097,362

UNITED STATES PATENT OFFICE 2,097,362

MOTOR VEHICLE

Frank C. Best, Detroit, Mich., assignor to Packard Motor Car Company, Detroit, Mich., a corporation of Michigan Application January 2, 1934, Serial No. 704,970

11 Claims. (Cl. 280—124)

This invention relates to motor vehicles and more particularly to vehicle wheel suspensions of the independent type in which either of two oppositely disposed road wheels may rise and fall without affecting the relationship of the other wheel and the vehicle frame.

It is the principal object of the invention to provide a wheel suspension of this type which is simple and inexpensive to construct and in which the wheels are constrained to move in rising and falling in such manner as to reduce to a minimum the wear on the tires and, in the application of the invention to steerable road wheels, to facilitate steering control thereof.

In the type of independent wheel suspension in which the road wheels in rising and falling remain parallel to the longitudinal plane of the vehicle frame and body, the central portion of the tire tread always engages the ground when the vehicle is driven straight ahead, there being no lateral displacement of the tread as the wheels rise and fall, with consequent reduction of wear. However, when a vehicle employing this type of construction is turned at a speed sufficient to cause the body to lean outwardly, the wheels, being maintained parallel with the body, also lean outwardly and there is too much steering recovery. In other words, each wheel forms in effect the base of a cone of which the elements of the cone contact with the road surface, and thus the vehicle tends to return to the straight ahead position and it is difficult to maintain the road wheels at the proper angle to negotiate the turn. Furthermore, in turning the vehicle the central portion of the tread no longer contacts the road, an undesirable feature.

In another type of construction, the wheels are constrained to tilt inwardly as they rise and outwardly as they fall below a normal position, the construction being such that as the vehicle is driven straight ahead, each wheel always remains substantially perpendicular to a line extending transversely of the vehicle in passing through the point of contact of the wheel tread with the ground and the intersection of the central vertical plane of the vehicle body with the ground. This construction is more satisfactory than that first described when the vehicle is turned, since the outward leaning of the vehicle body does not affect the relationship of the wheels to the ground, the wheels remaining substantially vertical regardless of the extent of body sidesway so that steering is not adversely affected. However, this type of construction is frequently characterized by excessive tread variation, the point of contact of the wheels with the ground being displaced inwardly as the wheels rise and fall, the movement being sometimes sufficient to entirely strip the tread from the tire.

In accordance with the present method of suspension, the plane of the wheels is displaced as in the second type of wheel suspension hereinbefore referred to so that the wheels remain in a substantially vertical position as the vehicle is turned, regardless of the extent of body sidesway, but the motion of the wheels in rising and falling is so controlled that the tread of the wheel is not materially displaced, a serious difficulty ordinarily encountered in this type of construction being thereby eliminated.

In the preferred embodiment of the invention the wheel suspension is of the split axle type, rising and falling movement of the wheel being yieldingly resisted by a leaf spring, the latter being so disposed as to function as a guide to largely determine the movement of which the wheel partakes during rising and falling. This construction is characterized by extreme stability and sturdiness.

A further object of the invention is the provision, in the application of the invention to steerable road wheels, of mechanism for effecting positive and accurate control of the steering movement of the wheels.

Further objects and features of the invention will be apparent from the following description taken in connection with the accompanying drawings, in which Figure 1 is a plan view of one embodiment of the invention showing a portion of the vehicle chassis;

Figure 2 is a vertical sectional view taken substantially on the line 2—2 of Figure 1;

Figure 3 is a front elevation of the arrangement shown in Figure 1 with certain of the parts shown in section; and Figure 4 is a view corresponding to Figure 1 and illustrating a modified form of steering mechanism.

In order to facilitate an understanding of the invention, specific language is employed in describing the various elements shown in the drawings which constitute the preferred form of the invention. It will nevertheless be understood that no limitation of the invention is thereby intended but that various alterations and changes are contemplated such as fall within the scope of the invention. Furthermore, while the invention has been illustrated as applied to the steerable road wheels of a vehicle and is particularly adapted thereto, many features of the invention are equally applicable to road wheels which are not steerable.

The vehicle frame is represented as comprising the usual side frame members 10 and 11 and a cross frame member 12, the latter extending between and being secured to the side frame members in any convenient manner. The wheel suspension is preferably similarly constructed at opposite sides of the center line of the vehicle and it will therefore suffice to describe for the most part the structure at one side of the vehicle only, the same reference characters being used to designate parts which perform similar functions at opposite sides of the vehicle.

Thus each road wheel 15 is journalled for rotation on a wheel spindle 16, the latter being integrally formed with a steering knuckle 18 which is in turn supported for swinging steering movement on an axle 20. It will be appreciated that the construction thus far described is entirely conventional and that the usual practice may be followed with respect to the inclination of the steering axis to afford the usual camber and caster, these features forming no essential part of the invention.

Each axle 20 extends transversely of the vehicle frame and is pivotally connected at that end remote from the road wheel carried thereby to a shackle member 22, the latter having articulated connection with the end of the axle and with a bracket 23 secured to the adjacent side frame member, whereby rocking movement of the axle in a generally transverse vertical plane is permitted.

A longitudinally extending leaf spring assembly 26 is secured at a point intermediate its ends to the axle 20 and is pivotally connected at its rear end to a bracket 28 secured to and depending from the associated side frame member. At its forward end the spring assembly is shackled as indicated at 30 to the forward end of the corresponding side frame member so as to permit longitudinal displacement of the forward end of the spring assembly.

As is apparent from the drawings and more particularly from Figure 3, the several leaves of the spring assembly are disposed in planes which are inclined downwardly and inwardly with respect to the horizontal. Otherwise expressed, the spring assembly is supported for flexure in a plane which is inclined with respect to the vertical. Thus as the road wheel rises on meeting an obstruction, the axle 20 and the wheel assembly will be displaced bodily inwardly of the frame while swinging at the same time about an axis having a varying location but disposed on the arc executed by that end of the shackle member 22 which is connected to the axle. The angle of inclination of the leaf spring and the disposition of the arc on which the inner end of the axle moves are so chosen that the bodily inward displacement of the wheel and the inward tilting of the plane of the wheel resulting from the movement executed by the supporting axle 20 combine to effect substantially vertical displacement of the wheel tread. Similarly, as the wheel falls from a normal position in passing over a depression in the road bed, the outward bodily displacement of the wheel as the result of the inclination of the leaf spring assembly which constitutes a guide for the wheel assembly is substantially offset, so far as the wheel tread is concerned, by the simultaneous outward inclination of the plane of the wheel, it being understood that in either rising or falling movement, the leaf spring is capable of executing the slight twisting movement about the longitudinal axis thereof which is required to permit the necessary swinging movement of the axle with respect to the frame. Since there is no substantial displacement of the wheel tread, tire wear is reduced to a minimum.

As the result of the inward tilting of the wheel plane on upward movement of the wheel and outward tilting of the wheel plane on downward movement of the wheel from a normal or midposition, the wheels always remain substantially parallel to each other and are maintained in substantially perpendicular relation with the road surface in rounding a curve, so that steering control may be effected with ease. It will be understood that canting of the wheels as the result of imperfect road surface when the vehicle is driven straight ahead does not seriously affect the steering since the displacement of the wheel plane is only momentary.

The employment of leaf springs in an independent wheel suspension is sometimes desirable to increase the stability of the vehicle and to reduce the tendency to sidesway. Thus the present construction is useful for the suspension of the rear wheels of a vehicle in which a suspension of the coil spring type, having greater flexibility but less stability, is applied to the front steerable road wheels. Under such circumstances the steering knuckle and associated parts will of course be carried rigidly by the axle and the road wheel may be driven in any suitable manner.

Various types of steering mechanism may be applied to effect positive conjoint control of the steerable road wheels, but it is preferred to employ a form of steering mechanism in which separate drag links are associated with the road wheel assemblies, two such forms of mechanism being shown in the drawings. In the first form, illustrated in Figures 1 and 2 of the drawings, drag links 34 and 35 at opposite sides of the vehicle are each pivotally connected adjacent their forward ends with arms 36 secured to or formed integrally with the associated steering knuckles 18. The drag link 34 is pivotally connected at its rear end to an upstanding arm 38 which is in turn rigidly secured to a shaft 40 extending transversely of the vehicle frame and supported thereby for rocking movement. At its opposite end the shaft 40 is provided with an arm 41, rigidly secured thereto, and connected by means of a link 43 to a bell crank lever 45, the link having articulated connection with both members. The downwardly extending arm of the bell crank lever 45 is pivotally connected to the rear end of the drag link 35. The bell crank lever is secured to a steering shaft 48 extending through the side frame member and into the usual steering housing 49, suitable gearing being disposed within the housing to effect rotation of the steering shaft. It will be appreciated that by this construction the drag links 34 and 35 are simultaneously moved in opposite directions to effect steering movement of the vehicle wheels in the same direction.

A modified form of steering mechanism is illustrated in Figure 4 of the drawings, the wheel suspension system shown therein corresponding substantially to that illustrated in Figures 1 to 3 inclusive. In this form of the invention drag links 52 are pivotally connected at their forward ends to arms 53 secured to or formed integrally with associated steering knuckles 18, the rearward ends of the links 52 being pivotally connected as at 54 to the respective laterally extending arms of a bell crank lever 55 fulcrumed for swinging movement on a substantially vertical axis 56 afforded by a frame member 58 extending between and secured to the side frame members 10 and 11. A link 60 is pivotally connected at its ends to one of the arms of the bell crank lever and to the usual steering drop arm 61 operable by gearing within the conventional steering housing 62.

Having thus described the invention, what is claimed as new and desired to be secured by Letters Patent is:

1. In a motor vehicle, the combination with a vehicle frame, of a road wheel assembly disposed adjacent said frame, and means supporting said road wheel assembly on said frame for rising and falling movement with respect thereto, said means comprising an axle carrying said wheel assembly, said axle extending transversely of the vehicle frame and being shackled to the latter to permit limited bodily transverse displacement of the axle, and a leaf spring secured to said axle and supported by said frame, said spring being disposed for flexure in a plane inclined at an acute angle with respect to the vertical.

2. In a motor vehicle, the combination with a vehicle frame, of an axle extending transversely of and having a shackled connection with said frame, and guiding means constraining said axle to move in a predetermined path, said means comprising a leaf spring assembly acting between said frame and said axle and disposed for flexure in a plane inclined at an acute angle with respect to the vertical, said spring assembly being secured to said axle and having pivotal and shackled connections at the respective ends thereof with said frame.

3. In a motor vehicle, the combination with a vehicle frame, of road wheels disposed at opposite sides of said frame, a split axle suspension supporting said wheels on said frame for independent rising and falling movement with respect to said frame and having shackled connections with said frame, and springs acting between said frame and said suspension for yieldingly resisting rising and falling movement of the wheels, said springs acting as guides for said suspension to control the movement of the wheels, and means whereby portions of the suspension immediately associated with the springs are constrained to move in a path conforming with the line of action of said springs and inclined at an acute angle with the vertical.

4. In a motor vehicle, the combination with a vehicle frame, of a road wheel assembly disposed adjacent said frame, and means supporting said road wheel assembly on said frame for rising and falling movement with respect thereto, said means comprising an axle carrying said wheel assembly, means connecting said frame and one portion of the axle to guide the said portion for bodily displacement in a predetermined path, and yielding means acting between said frame and a second portion of the axle to guide the second portion in a second predetermined path and to resist upward movement of the axle, said second predetermined path extending generally inwardly and upwardly with respect to the vehicle frame.

5. In a motor vehicle, the combination with a vehicle frame, of a road wheel assembly disposed adjacent said frame, and means supporting said road wheel assembly on said frame for rising and falling movement with respect thereto, said means comprising an axle of fixed length carrying said wheel assembly, means connecting said frame and one portion of the axle to guide the said portion in a predetermined path, and yielding means acting between said frame and a second portion of the axle to guide the second portion in a second predetermined path and to resist upward movement of the axle, said second predetermined path extending generally inwardly and upwardly with respect to the vehicle frame, the relationship of said predetermined paths being such that the wheel tread rises substantially vertically.

6. In a motor vehicle, the combination with a vehicle frame, of a road wheel assembly disposed adjacent said frame, and means supporting said road wheel assembly on said frame for rising and falling movement with respect thereto in a path such that the plane of the wheel remains substantially vertical with respect to a flat road bed as the vehicle is turned at high speed, said means comprising a transversely extending axle having the inner end thereof shackled to said frame to permit transverse displacement of the axle, and yielding means acting between said frame and axle to resist rising movement of the latter, the disposition of said yielding means being such that the point of connection thereof with the axle is constrained to move inwardly as the axle rises.

7. In a motor vehicle, the combination with a vehicle frame, of a road wheel assembly disposed adjacent said frame, and means supporting said road wheel assembly on said frame for rising and falling movement with respect thereto in a path such that the plane of the wheel remains substantially vertical with respect to a flat road bed as the vehicle is turned at high speed, said means comprising a transversely extending axle having the inner end thereof shackled to said frame to permit transverse displacement of the axle, and yielding means acting between said frame and axle to resist rising movement of the latter, the disposition of said yielding means being such that the point of connection thereof with the axle is constrained to move inwardly as the axle rises, said yielding means comprising a leaf spring secured to the axle and disposed for flexure in a plane inclined at an acute angle with the vertical.

8. In a motor vehicle, the combination with a vehicle frame, of a steerable road wheel assembly disposed adjacent said frame, and means supporting said road wheel assembly on said frame for independent rising and falling movement with respect thereto, said means comprising an axle carrying said wheel assembly, said axle extending transversely of the vehicle frame and being shackled to the latter to permit limited bodily transverse displacement of the axle, and a leaf spring secured to said axle and supported by said frame, said spring being disposed for flexure in a plane inclined at an acute angle with respect to the vertical, said wheel assembly having a steering arm, a steering member movably supported on said frame, and a link having pivotal connection with said arm and member.

9. In a motor vehicle, the combination with a vehicle frame, of steerable road wheels disposed at opposite sides of said frame, a split axle suspension supporting said wheels on said frame for independent rising and falling movement with respect to said frame, said split axle suspension comprising a pair of axles each supporting one of said wheels and connected to that side of said frame remote from said wheel, said connections comprising means guiding the connected parts of said respective axles in arcuate paths, and springs acting between said frame and said suspension for yieldingly resisting rising and falling movement of the wheels, said springs being constructed and arranged to act as guides for said suspension to control the movement of the wheels, and steering mechanism controlling said wheels.

10. In a motor vehicle, the combination with a vehicle frame having side frame members defining opposite sides of the frame, of road wheel assemblies disposed laterally of said side frame members, axles carrying said wheel assemblies, a non-rigid connection between each axle and the remote side frame member, said connection comprising means guiding the connected part of said axle in an arcuate path, and a longitudinally extending leaf spring assembly carried by said frame and connected with each axle, said spring assemblies being disposed for flexure in planes forming an acute angle with the vertical.

11. In a motor vehicle, the combination with a vehicle frame, of road wheels disposed adjacent said frame, and means supporting and guiding said road wheels for independent rising and falling movement in predetermined paths with respect to said frame, said means consisting of axles carrying said wheels, each axle extending transversely of said frame, separate connections between the frame and each axle, said connections comprising means guiding the connected parts of said respective axles in arcuate paths, and spring means acting between each axle and said frame, each spring means being so disposed that the line of action thereof is inclined at an acute angle with respect to the vertical and being secured to a portion of the associated axle, whereby the latter is constrained to move in a path conforming generally to the line of action of said spring means.

FRANK C. BEST.